United States Patent
Kudryavtsev et al.

(10) Patent No.: US 11,756,697 B2
(45) Date of Patent: Sep. 12, 2023

(54) DETACHABLE CONNECTION IN NUCLEAR REACTOR CONTROL SYSTEM

(71) Applicant: STATE ATOMIC ENERGY CORPORATION "ROSATOM" ON BEHALF OF THE RUSSIAN FEDERATION, Moscow (RU)

(72) Inventors: Mikhail Yuryevich Kudryavtsev, Moscow (RU); Polina Yuryevna Lupa, Moscow (RU)

(73) Assignee: State Atomic Energy Corporation "Rosatom" on Behalf of the Russian Federation, Moscow (RU)

( * ) Notice: Subject to any disclaimer, the term of this patent is extended or adjusted under 35 U.S.C. 154(b) by 0 days.

(21) Appl. No.: 17/432,052

(22) PCT Filed: Dec. 30, 2019

(86) PCT No.: PCT/RU2019/001043
§ 371 (c)(1),
(2) Date: Aug. 18, 2021

(87) PCT Pub. No.: WO2020/171737
PCT Pub. Date: Aug. 27, 2020

(65) Prior Publication Data
US 2022/0130560 A1    Apr. 28, 2022

(30) Foreign Application Priority Data
Feb. 18, 2019   (RU) ............................ RU2019104508

(51) Int. Cl.
*G21C 7/00*   (2006.01)
*G21C 7/10*   (2006.01)

(52) U.S. Cl.
CPC ................. *G21C 7/00* (2013.01); *G21C 7/10* (2013.01)

(58) Field of Classification Search
CPC .................................... G21C 7/00; G21C 7/10
USPC ................................................. 376/228, 233
See application file for complete search history.

(56) References Cited

U.S. PATENT DOCUMENTS

| 3,158,766 A |   | 11/1964 | Erling |
| 5,009,834 A | * | 4/1991 | Tessaro ..................... G21C 7/14 376/232 |

FOREIGN PATENT DOCUMENTS

| DE | 2741227 A1 | * | 3/1979 | ............... G21C 7/12 |
| EP | 0026142 A1 | * | 4/1981 | ............... G21C 7/12 |
| RU | 1522973 |   | 2/1994 | |
| RU | 2059301 |   | 4/1996 | |

(Continued)

OTHER PUBLICATIONS

Europe Supplementary Search Report dated Jan. 26, 2023 for Application 19916062.3 filed Dec. 30, 2019 (7 pages).

(Continued)

*Primary Examiner* — Jack W Keith
*Assistant Examiner* — Daniel Wasil
(74) *Attorney, Agent, or Firm* — Dentons US LLP

(57) ABSTRACT

This disclosure enables a creation of a detachable connection between a linear motor tubular armature and a vertical cylindrical rod of an actuator of a control and protection system of a nuclear reactor. Such configuration reduces a dose load on a member of personnel, as well as provides an increase in reliability of a coupling of the linear motor tubular armature and the vertical cylindrical rod in conditions of high temperature and radiation.

1 Claim, 2 Drawing Sheets

(56) References Cited

FOREIGN PATENT DOCUMENTS

RU        2237298        9/2004
RU         129983        7/2013

OTHER PUBLICATIONS

International Search Report and Written Opinion dated Apr. 30, 2014 for International Application PCT/RU2019/001043 filed Dec. 30, 2019 (7 pages).

* cited by examiner

DETACHABLE CONNECTION IN NUCLEAR REACTOR CONTROL SYSTEM

CROSS-REFERENCE TO RELATED DISCLOSURE

This application is a U.S. National Stage of International Application No. PCT/RU2019/001043 filed on Dec. 30, 2019 published as WO 2020/171737 on Aug. 27, 2020 with the title "DETACHABLE CONNECTION," which claims priority to RU 2019104508 filed on Feb. 18, 2019. Each application, publication, and patent listed in this paragraph are hereby incorporated by reference in their entireties.

BACKGROUND

Field of the Invention

The invention relates to the field of nuclear industry and can be used in the detachable connection of a linear motor tubular armature and a vertical cylindrical rod of the actuator of the nuclear reactor control and protection system.

Prior Art

The closest to the claimed invention in terms of the combination of essential features is a detachable connection of a linear motor tubular armature and a vertical cylindrical rod of the actuator of a nuclear reactor (Principles of the design of the nuclear reactor control actuators). I. Ya. Emelyanov, V. V. Voskoboynikov, B. A. Maslenok; M.: Energoatomizdat, 1987; FIG. 3.15c, p. 41).

The above-mentioned detachable connection of the tubular armature of a linear stepper motor with a vertical cylindrical rod, installed with the possibility of vertical movement and angular rotation, in fact, is a bayonet connection of the anchor with the rod, fixed with a spring stop at the lower end of the rod.

The disadvantage of this detachable connection is the possibility of its spontaneous uncoupling as a result of the failure of the spring stop due to hard radiation and high temperature in the area of the lower end of the rod.

DISCLOSURE OF THE INVENTION

The object of invention hereof is to create a detachable connection of a linear motor tubular armature and a vertical cylindrical rod of the actuator of the control and protection system of a nuclear reactor, which reduces the dose loads on personnel, as well as provides increase in the reliability of the coupling of the armature and rod in conditions of high temperature and radiation.

The technical result of the present invention is prevention of spontaneous uncoupling of the detachable connection of the linear motor tubular armature and the vertical rod of the actuator of the control and protection system of the nuclear reactor, while reducing the running actions for coupling-uncoupling of the detachable connection.

The said technical result is achieved by the fact that in the detachable connection of the linear motor tubular armature and the vertical cylindrical rod of the nuclear reactor control actuator, the rod is located in the guide pipe, L-shaped slots are made at the end of the armature, and vertical slots are made above them, and the rod is installed in the armature with an annular gap, in which a tubular fork with pins is placed, and at the same time radial protrusions are made on the rod, and in the guide pipe—below the vertical slots in the armature—the bushing with ⌐-shaped grooves which allow inserting (removing) the rod protrusions into them is fixed coaxially with the armature, and the lower part of the armature is closed by a longitudinally fixed plug, on the side surface of which there are ⌐-shaped grooves for inserting (removing) the fork pins.

The use of the above-described connection of the armature with the rod prevents the spontaneous rotation of the rod, since its structural elements are located above the rod in the area of low temperatures and the absence of radiation, which allows maintaining its initial operational characteristics (strength, ductility, etc.) and, thereby, increasing the reliability of the rod coupling with the control member. In addition, the said connection simplifies the procedure of coupling-uncoupling the rod of the control member with the linear motor armature.

BRIEF DESCRIPTION OF DRAWINGS

The essence of the claimed invention is explained by the drawings, where

Figure 1:
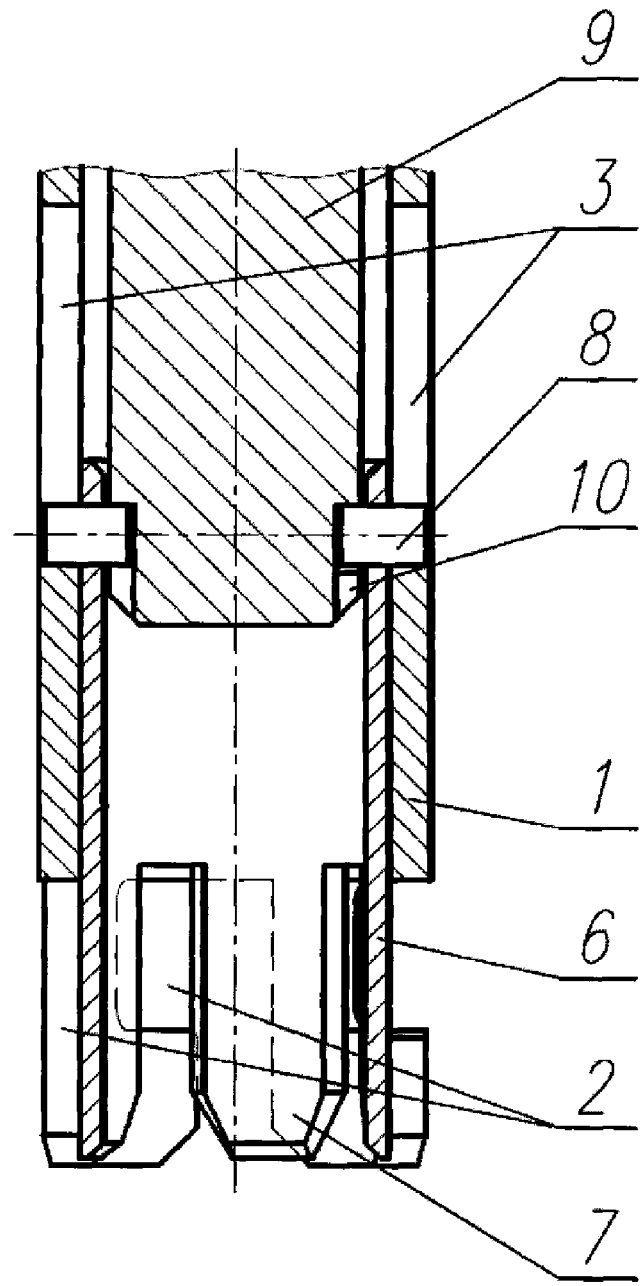
FIG. 1 shows a detachable connection when connecting (coupling) the armature with a rod.
Figure 2:
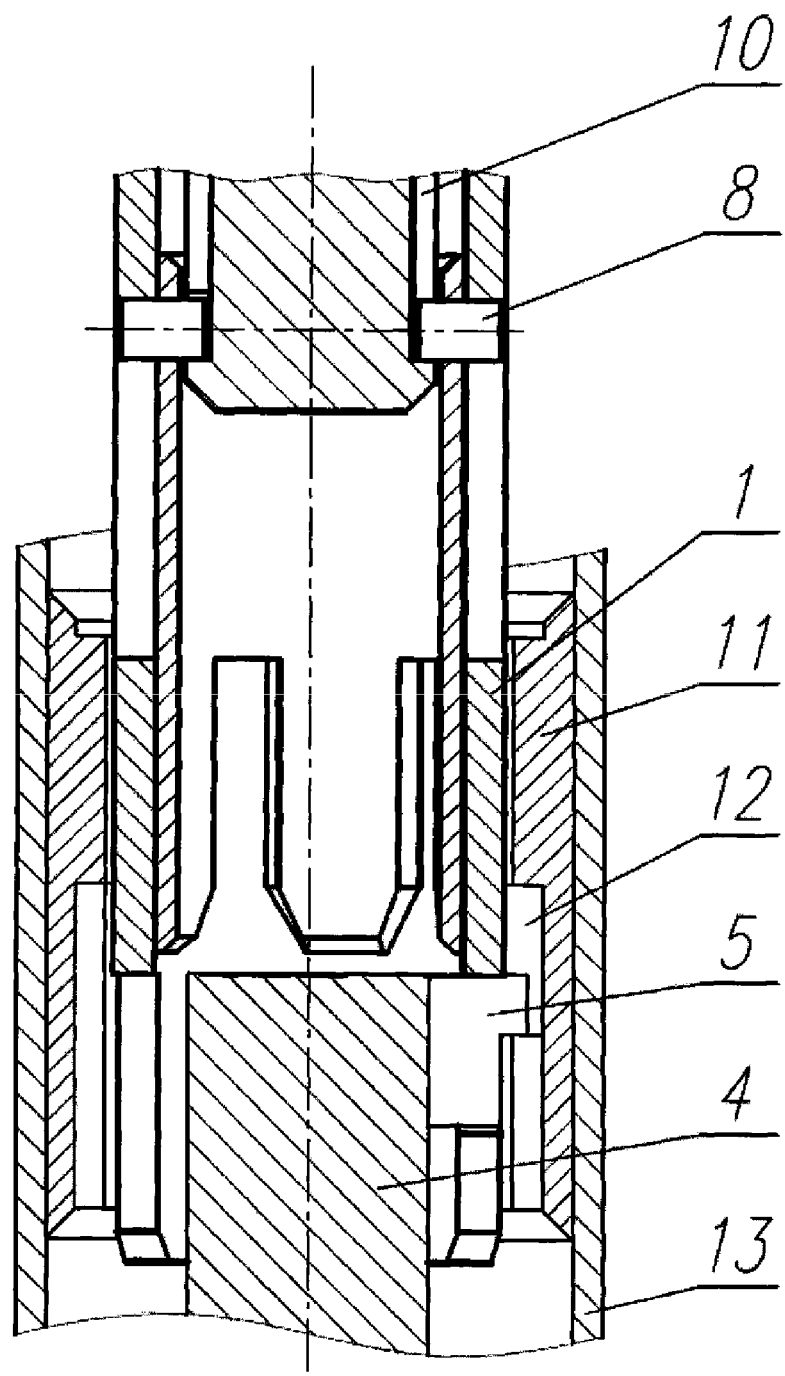
FIG. 2 shows a detachable connection when disconnecting (uncoupling) the armature from a rod.

The figures show the tubular armature 1 of a linear stepper motor, L-shaped slots 2 of the armature 1, vertical slots 3 of the armature 1, vertical cylindrical rod 4, radial protrusions 5 on the rod 4, tubular fork 6, teeth 7 of the fork 6, pins 8 of the fork 6, plug 9, ⌐-shaped grooves 10 of the plug 9, bushing 11 with ⌐-shaped grooves 12, guide pipe 13.

THE BEST EMBODIMENT OF THE INVENTION

The detachable connection of the linear motor tubular armature and the vertical cylindrical rod of the actuator of the control and protection system of the nuclear reactor functions as follows.

Linear stepper motor (not shown in the figure) vertically moves the tubular armature 1 and the cylindrical rod 4 connected to the control member (not shown in the figure). The movement of the control member enhances or weakens the nuclear reaction in the core of a nuclear reactor.

To attach the armature 1 to the rod 4, the radial protrusions 5 of the rod 4 are first brought into the upper lateral vertical sections of the ⌐-shaped grooves 12 of the bushing 11, which is fixed coaxially to the armature 1 in the guide pipe 13. Then, the protrusions 5 are moved along the horizontal sections of the ⌐-shaped grooves 12 of the bushing 11 into the central blind vertical sections of the ⌐-shaped grooves 12 of the bushing 11 This prevents the rotation of the rod 4 when coupling and uncoupling with the armature 1. After that, the armature 1 is lowered until the protrusions 5 of the rod 4 bump into the end of the armature 1 and the armature 1 is rotated until the protrusions 5 enter the vertical sections of the L-shaped slots 2 of the armature 1. Then the armature 1 is lowered until the protrusions 5 bump into the point of transition of the vertical part of the L-shaped slot 2 into the horizontal one. In this position, the protrusions 5 pass through the annular gap between the armature 1 and the rod 4. Located in this gap, the tubular fork 6 rests with teeth 7 on the protrusions 5 of the rod 4 and does not lower. Next, the armature 1 is rotated until the protrusions 5 stop at the dead ends of the horizontal sections of the L-shaped slots 2, while the teeth 7 cease to rest on the protrusions 5, and the fork 6 lowers until the pins 8 stop at the lower end of the vertical slots 3 of the armature 1, locking with the teeth 7 the protrusions 5 of the rod 4 in the horizontal sections of the L-shaped slots 2 of the armature 1. At the same time, the transverse pins 8 of the fork 6 located in the upper part enter with the outer ends into the slots 3 of the armature 1, which allow only vertical movement of the fork 6 relative to the armature 1 from the lower to the upper stops of the pins 8 in the slots 3 of the armature 1.

Coupling is controlled by attempting to turn the armature 1. If the fork 6 has moved to the position of locking with the teeth 7 of the fork 6 of the protrusions 5 of the rod 4 in the horizontal blind sections of the L-shaped slots 2, the armature 1 does not rotate because the protrusions 5 of the rod 4 are located in the central vertical sections of the ⊔-shaped grooves 12 of the fixed bushing 11.

To uncouple the armature 1 from the rod 4, the protrusions 5 of the rod 4 are brought into the central vertical sections of the ⊔-shaped grooves 12 of the bushing 11. After that, the armature 1 with the rod 4 is lifted up to the stop of the pins 8 from below to the place of transition of the lower vertical section to the horizontal section of ⊓-shaped grooves 10 of the vertically fixed plug 9, which covers the lower part of the armature 1 to protect personnel from the reactor radiation. Then the plug 9 is rotated relative to the armature 1 until the pins 8 stop at the place of transition of the horizontal section to the upper vertical section of the ⊔-shaped grooves 10. After that, the armature 1 with the rod 4 is lowered until the pins 8 stop at the upper ends of the vertical slots 3, while the fork 6 is not lowered, and the protrusions 5 together with the armature 1 fall below the teeth 7 of the fork 6 and get the opportunity to exit the L-shaped slots 2 of the armature 1. Then the plug 9 is turned together with the armature 1 until the protrusions 5 of the rod 4 stop at the place of transition of the vertical section into the horizontal section of L-shaped slots 2. In this position, the rod 4 cannot be turned, because the protrusions 5 of the rod 4 are located in the vertical sections of the ⊔-shaped grooves 12 of the bushing 11. After that, the armature 1 is raised to the exit of the protrusions 5 of the rod 4 from the L-shaped slots 2 of the armature 1. In the position of uncoupling the armature 1 with the rod 4, the inner ends of the pins 8 are located in the ⊓-shaped grooves 10 of the plug 9.

Thus, this detachable connection prevents the possibility of spontaneous uncoupling of the tubular armature of a linear stepper motor by a vertical cylindrical rod of the nuclear reactor actuator while reducing the dose loads on personnel due to a reduction in the number of running actions for coupling-uncoupling the detachable connection.

INDUSTRIAL APPLICABILITY

The invention can be applied in a detachable connection of a linear motor tubular armature and a vertical cylindrical rod of the actuator of the control and protection system of a nuclear reactor.

What is claimed is:

1. A system comprising:

a nuclear reactor including a linear motor tubular armature, a vertical cylindrical rod, a guide pipe, and a detachable connection between the linear motor tubular armature and the vertical cylindrical rod;

wherein the vertical cylindrical rod is located inside of the guide pipe; the linear motor tubular armature comprises a plurality of L-shaped slots at its end and a plurality of vertical slots above the L-shaped slots; the vertical cylindrical rod is installed inside of the linear motor tubular armature forming an annular gap between the linear motor tubular armature and the vertical cylindrical rod;

wherein the detachable connection includes: (i) a tubular fork with a plurality of pins located inside of the linear motor tubular armature; (ii) a plurality of radial protrusions extending on the vertical cylindrical rod; and (iii) a bushing extending inside of the guide pipe and below the vertical slots of the linear motor tubular armature, the bushing including a plurality of first profiled grooves fastened in coaxial alignment with the linear motor tubular armature such that the radial protrusions can be inserted into and removed from the first profiled grooves, each of the first profiled grooves of the bushing having a top side vertical section, two horizontal sections at different vertical levels separated by a central vertical section arranged therebetween and extending toward the central vertical section, and a lower side vertical section such that an upright L-shape is formed and an inverted L-shape is formed and the central vertical section extends between the upright L-shape and the inverted L-shape:

wherein the linear motor tubular armature includes a lower part that is closed by a longitudinally immovable plug having a side surface, wherein on the side surface of the longitudinally immovable plug there is a plurality of second profiled grooves configured for inserting or removing the pins of the tubular fork, each of the second profiled grooves of the longitudinally immovable plug having a lower vertical section, a central horizontal section and a top vertical section arranged such that the central horizontal section spans between the lower vertical section and the top vertical section, the lower vertical section and the top vertical section extend from the central horizontal section in opposing directions, the lower vertical section perpendicularly extends from the central horizontal section, and the top vertical section perpendicularly extends from the central horizontal section.

* * * * *